United States Patent
Boling et al.

(10) Patent No.: US 9,805,036 B2
(45) Date of Patent: Oct. 31, 2017

(54) SCRIPT-BASED MULTIMEDIA PRESENTATION

(71) Applicant: Disney Enterprises, Inc., Burbank, CA (US)

(72) Inventors: Shawn Allen Boling, Davenport, FL (US); Ronald Dearing, Windermere, FL (US); Gregory Johnson, Clermont, FL (US); Alexander Pennock, Melbourne, FL (US); Gregory Hale, Orlando, FL (US); Evan Simpson, Orangevale, CA (US); Victoria L. Coleman, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 155 days.

(21) Appl. No.: 14/732,407

(22) Filed: Jun. 5, 2015

(65) Prior Publication Data
US 2016/0358627 A1    Dec. 8, 2016

(51) Int. Cl.
*G06F 17/30* (2006.01)
*G11B 27/00* (2006.01)
(Continued)

(52) U.S. Cl.
CPC ...... *G06F 17/30056* (2013.01); *G11B 27/002* (2013.01); *G11B 27/34* (2013.01);
(Continued)

(58) Field of Classification Search
CPC .. G06F 3/0482; G06F 9/544; G06F 17/30017; G06F 17/30056;
(Continued)

(56) References Cited

U.S. PATENT DOCUMENTS 5,619,733 A * 4/1997 Noe ..................... G11B 27/002
                                                        370/503
5,832,309 A * 11/1998 Noe ..................... G11B 27/002
                                                         710/61
(Continued)

OTHER PUBLICATIONS

ProPresenter 6, "ProPresenter 6—Extending the Power Even Further," downloaded from <http://www.renewedvision.com/propresenter.php> on Jun. 5, 2015, 5 pages.

*Primary Examiner* — Crystal J Barnes-Bullock
(74) *Attorney, Agent, or Firm* — Patterson + Sheridan, LLP

(57) ABSTRACT

Embodiments disclosed herein generally relate to a method, computer program product, and system to seamlessly integrate a multimedia presentation with triggered content provided using one or more external devices. The method includes processing a presentation script that specifies (i) one or more accessible audiovisual content items and (ii) a sequence of the audiovisual content items for presentation during the multimedia presentation. The method also includes transmitting the one or more audiovisual content items to one or more audiovisual output devices according to the sequence, and transmitting control signals to the one or more external devices to operate the external devices according to timing information included in the presentation script and with reference to at least one of the audiovisual content items, thereby seamlessly integrating content provided using the external devices with the multimedia presentation.

20 Claims, 7 Drawing Sheets

(51) Int. Cl.
*G11B 27/34* (2006.01)
*H04N 5/268* (2006.01)
*G11B 20/10* (2006.01)

(52) U.S. Cl.
CPC ... *H04N 5/268* (2013.01); *G11B 2020/10537* (2013.01); *G11B 2020/10759* (2013.01); *G11B 2020/10777* (2013.01)

(58) Field of Classification Search
CPC .............. H04N 7/17318; H04N 21/254; H04N 21/422; H04N 21/432; H04N 21/4325; H04S 7/303; H04H 20/93; H04H 20/103; G11B 20/10527; G11B 2020/10537; G11B 2020/10759; G11B 2020/10777; G11B 27/002; G11B 27/105
See application file for complete search history.

(56) References Cited

U.S. PATENT DOCUMENTS

| | | | | |
|---|---|---|---|---|
| 6,446,130 B1* | 9/2002 | Grapes | ............. | G06F 17/30017 348/E7.071 |
| 6,557,171 B1* | 4/2003 | Sonoda | ................. | H04H 20/93 348/E5.108 |
| 7,852,348 B2* | 12/2010 | Rackham | .................. | A63J 1/00 345/170 |
| 7,913,288 B2* | 3/2011 | DorEl | ................. | H04N 21/422 710/10 |
| 8,156,417 B2* | 4/2012 | Sudoh | ............... | G06F 17/30041 715/202 |
| 8,612,643 B2* | 12/2013 | Rangarajan | ............. | G06F 9/544 709/212 |
| 8,650,477 B2* | 2/2014 | Sudoh | ................ | G06F 17/30041 715/202 |
| 8,666,993 B2* | 3/2014 | Chunilal | ........... | G06F 17/30861 705/14.54 |
| 8,863,165 B2* | 10/2014 | Gordon | ................ | H04N 21/254 725/116 |
| 9,015,741 B2* | 4/2015 | Gordon | ................ | H04N 7/17318 725/14 |
| 9,244,925 B2* | 1/2016 | Avrahami | ............... | H04S 7/303 |
| 9,477,380 B2* | 10/2016 | Amijee | ................ | G06F 3/0482 |
| 2002/0180803 A1* | 12/2002 | Kaplan | ............. | G06F 17/30017 715/810 |
| 2008/0184143 A1* | 7/2008 | Gottlieb | ............... | G11B 27/034 715/764 |
| 2009/0133054 A1* | 5/2009 | Boggie | ................ | H04H 20/103 725/32 |
| 2011/0119587 A1* | 5/2011 | Joy | ...................... | G11B 27/105 715/720 |

* cited by examiner

SCRIPT-BASED MULTIMEDIA PRESENTATION

BACKGROUND

Field of the Disclosure

The present disclosure relates to script-based multimedia presentation with integrated content from external devices.

Description of the Related Art

Multimedia is typically recorded and played, displayed, or accessed by information content processing devices, such as personal computerized and electronic devices, but can also be included as part of a live performance. Multimedia presentations are viewed in a number of different ways, such as on-stage display, projection, transmission, or local playback using a media player. A broadcast can be a live or recorded multimedia presentation. Broadcasts and recordings can include analog and/or digital electronic media technology. Digital online multimedia can be downloaded or streamed (e.g., live or on-demand).

SUMMARY

Embodiments disclosed herein generally relate to a method, computer program product, and system to integrate a multimedia presentation with triggered content provided using one or more external devices. The system includes a computing device configured to process a presentation script that specifies one or more audiovisual content items that are accessible by the computing device, as well as prescribes a sequence of the audiovisual content items for presentation during the multimedia presentation. The system further includes one or more audiovisual output devices coupled with the computing device and configured to display the one or more audiovisual content items, as well as the one or more external devices also coupled with the computing device. The computing device is further configured to transmit control signals to the one or more external devices to operate the external devices according to timing information included in the presentation script and with reference to at least one of the audiovisual content items, thereby integrating content provided using the external devices with the multimedia presentation.

DETAILED DESCRIPTION

Figure 1:
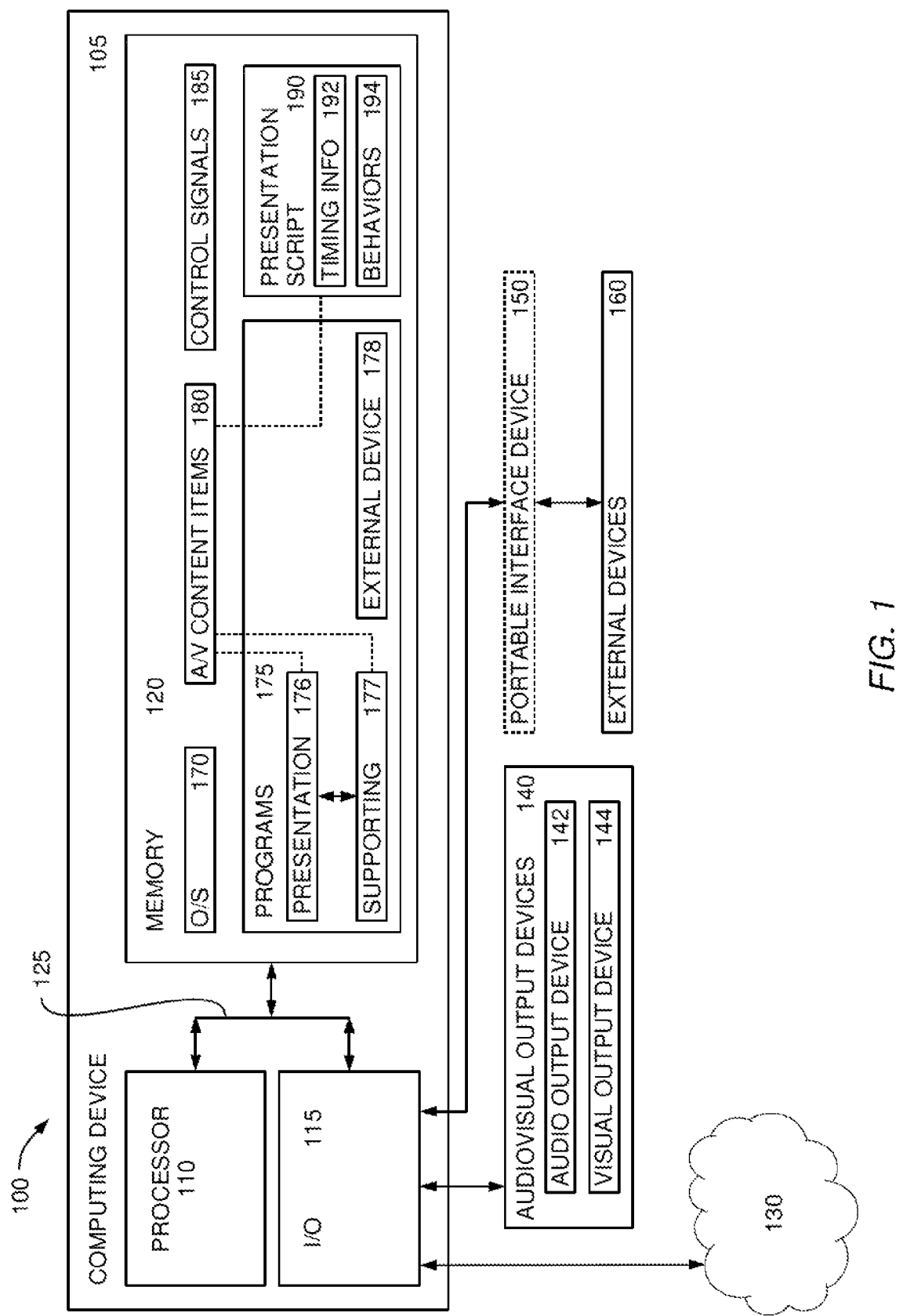
FIG. 1 illustrates a multimedia presentation control arrangement, according to one embodiment.

Embodiments disclosed herein generally relate to a method, computer program product, and system to integrate a multimedia presentation with triggered content provided by one or more external devices. The system includes a computing device configured to process a presentation script that specifies one or more audiovisual (AV) content items that are accessible by the computing device, as well as prescribes a sequence of the audiovisual content items for presentation during the multimedia presentation. The system further includes one or more audiovisual output devices coupled with the computing device and configured to display the one or more audiovisual content items, as well as the one or more external devices also coupled with the computing device. The computing device is further configured to transmit control signals to the one or more external devices to operate the external devices according to timing information included in the presentation script and with reference to at least one of the audiovisual content items, thereby integrating content provided using the external devices with the multimedia presentation.

Integration of external content into multimedia presentations generally enhances the presentation environment, complementing AV content items that are presented in predetermined, sometimes fixed location(s) within the environment and providing greater sensory immersion and a sense of enhanced realism for the audience of viewers. For example, introducing external content enhances multimedia presentations in cases where the AV content items can be more or less static (e.g., a movie file whose content cannot be dynamically adapted within the environment). Moreover, external content in some cases can be used to expand the accessibility of the multimedia presentation for a greater audience, e.g., designing the external content to be suitable for different age groups, presenting content to assist persons with hearing or visual impairments, etc.

Content and control of the multimedia presentation and activation of external devices can be performed from a single computing device, such as a desktop or laptop computer or a mobile computing device. The computing device when executing the presentation script can trigger content from external devices seamlessly with the presentation of AV content items, instead of coordinating the timing of the AV content items with reference to the external content, controlled by the programming of an external show controller.

Additionally, the activation of external devices may be enabled for an "ordinary" computing device (such as a personal computer operating using Mac OS®, Windows®, Linux®, or UNIX® operating systems) by connecting the computing device with a portable interface device and by executing the presentation software on the computing device. The portable interface device can overcome limitations of the computing device and extend the wireless communications capabilities of the computing device. The presentation software enables end-users to script the multimedia presentation, including controlling external devices, without requiring computer programming on the part of the end user.

FIG. 1 illustrates a multimedia presentation control arrangement 100, according to one embodiment. Multimedia presentation control arrangement 100 includes a computing device 105 coupled with a network 130, one or more audiovisual output devices 140, and one or more external devices 160.

The computing device 105 includes a processor 110, an input/output 115, and a memory 120. Each of these components can be interconnected using one or more buses 125 or other interfaces. Some non-limiting examples of computing device 105 include personal computer systems, server computer systems, thin or thick clients, handheld, mobile, or laptop devices, multiprocessor systems, microprocessor-based systems, set top boxes, programmable consumer electronics, network PCs, minicomputer systems, mainframe computer systems, and so forth. In some embodiments, computing device 105 is a singular device. In other embodiments, the computing device 105 represents a consolidation of virtualized computing resources provided by multiple computing devices, which can be managed by a hypervisor.

Processor 110 can generally include any processing element capable of performing various functions described herein. While depicted as a single element within computing device 105, processor 110 is intended to represent a single processor, multiple processors, a processor or processors having multiple cores, as well as combinations thereof. In one embodiment, processor 110 is a central processing unit (CPU) of the computing device 105. Memory 120 can include a variety of computer readable media selected for relative performance or other capabilities: volatile and/or non-volatile media, removable and/or non-removable media, etc. Memory 120 can include cache, random access memory (RAM), storage, etc. Memory 120 can include one or more discrete memory modules, such as dynamic RAM (DRAM) dual inline memory modules (DIMMs). Various memory chips, bandwidths, and form factors may alternately be selected. Storage typically provides a non-volatile memory for the computing device 105, and can include one or more different storage elements such as Flash memory, a hard disk drive, a solid state drive, an optical storage device, and/or a magnetic storage device.

Memory can include an operating system (OS) 170 that is executed by the computing device 105, and upon which other applications or programs are executed. One or more programs 175 can include program code to support a number of different functions provided by the computing device 105. As shown, programs 175 include a presentation program 176 as well as one or more supporting programs 177. The presentation program 176 can perform the overall coordination and execution of the multimedia presentation, and can access and present one or more audiovisual (AV) content items 180 as part of the multimedia presentation. The AV content items 180 can be pre-stored in memory 120 and/or can be accessed in real-time during the multimedia presentation, for example by contemporaneously streaming media through the network 130. The AV content items 180 can include content provided using various media (e.g., analog recordings, digital files, etc.) and having any suitable presentation format (audio, video, slideshows, websites, text documents, etc.). As defined herein, AV content items 180 include at least one type of sensory-based content. For example, AV content items 180 can include audio-based and visual-based content, but it is not required that each item include both audio and visual content. In other words, purely audio-based content items and purely video-based content items are considered to be included within the scope of AV content items 180. In some embodiments, the AV content items 180 can include different sensory capabilities, such as touch (haptic), taste, smell, etc. In some embodiments, the presentation program 176 can call on one or more supporting programs 177 to provide various aspects of the multimedia presentation. For example, the presentation program 176 during operation can initiate, run, and/or close applications such as Microsoft PowerPoint® presentation software or other slideshow software, productivity software (e.g., the Microsoft Office® suite, Adobe Acrobat® software, and so forth), audio or video players, and so forth. Supporting programs 177 such as these can be used to access the AV content items 180, without requiring the presentation program 176 to natively support each possible type of AV content. This feature could also support the adaptation of the presentation program 176 to support new types of AV content, as the presentation program 176 can execute an appropriate supporting program 177 in order to present the new content.

Operation of the presentation program 176, including the various calls to supporting applications, can be controlled according to a preprogrammed presentation script 190 that is also included in the memory 120. The presentation script 190 can have any suitable format, such as one or more configuration files, and can include various aspects of presentation control such as timing information 192 and various behaviors 194. Generally, the presentation script 190 can be formatted as written story lines that are interpreted by the presentation program 176 to generate the integrated multimedia presentation. In some embodiments, the presentation script 190 is not written as software code. Instead, the presentation script 190 may be written in natural language or a quasi-natural language, which does not require the presentation programmer to have an in-depth knowledge of computer programming languages. The presentation script 190 may include a sequence (not shown) for presenting the AV content items 180. In one embodiment, the sequence may be a simple order of the content items (e.g., play a first item, then a second item, then a third item), or the sequence may be configured to permit more granular control of the presentation, such as time selections for each content item, transition timing and effects between content items, etc.

The timing information 192 generally specifies a time at which a particular action (i.e., a selected behavior 194) will occur. In some embodiments, the timing information 192 may be provided with reference to a particular AV content item(s) 180. For example, for a slideshow presentation file, timing information may be with reference to the slide number and/or the time on a particular slide or within the slideshow. Timing information references may vary depending on the properties of the particular AV content item 180. In some cases, the timing information 192 is based on any suitable distinguishing characteristic included in the AV content without explicitly including time-based information. For example, a selected behavior could occur responsive to an all-black frame within a video file.

Behaviors 194 generally include sets of customizable and/or selectable actions that can be performed by the one or more external devices 160. The behaviors 194 can be varied depending on the specific functionality of each external device 160. Generally, the behaviors 194 include audio or visual effects, tactile effects, speech generation, device actuation, message generation and transmission, and so forth.

Computing device 105 generates one or more control signals 185, which can be sent to the audiovisual output devices and/or to the various external devices. The control signals can be generated using the presentation program 176 and based on the timing information 192 and behaviors 194 of the presentation script 190. In one embodiment, the presentation program 176 uses an external device program 178 to adapt higher-level commands included in the presentation script 190 into a format suitable for controlling the particular external device 160.

In one embodiment, the control signals 185 can be provided in a plurality of stages to control external devices 160. For example, a first stage can include a configuration signal transmitted by the computing device to provide a desired reconfiguration of a particular external device 160 or portable interface device 150. The configuration signal can specify a limited and/or simplified set of data (e.g., a codebook) representing commands that may be used during operation of the external device with certain behaviors premapped to the command data. Then, during the multimedia presentation, a second stage of control signals can be sent to the external device based on the predefined command data. By using a limited set of data during the multimedia presentation, the processing load of the computing device 105 is reduced. This may be advantageous, as the computing device 105 might already be responsible for processing large media content items without permitting lag or buffering.

The computing device 105 can communicate with other devices, such as peripheral devices or other networked computing devices, using input/output (I/O) 115. The I/O 115 can include a number of different I/O adapters including various circuitry, such as network interface cards (NICs) for connecting to network 130. Other I/O adapters can generally support an end-user's interface with the computing device 105. For example, I/O 115 can include connections for visual/audio/other sensory output devices, as well as connections for input devices such as a keyboard, mouse, touchscreen, etc. In one embodiment, I/O 115 includes graphics cards that include separate processing elements and/or memory.

Network 130 is included as representative of one or more networks of any suitable type. Some non-limiting examples of network 130 include a local area or local access network (LAN), a general wide area network (WAN), and/or a public network (e.g., the Internet).

Audiovisual output devices 140 are used to present AV content items 180 as part of a multimedia presentation. The audiovisual output devices 140 may include one or more audio output devices 142 as well as one or more visual output devices 144. As with the AV content items, the scope of audiovisual output devices is intended to include audio devices, visual devices, as well as combination devices. Some examples of audio output devices 142 include headphones and audio speakers (whether as standalone devices or integrated with other components). Some examples of visual output devices 144 include projectors and electronic displays of any suitable type. The audio output devices 142 and visual output devices 144 may connect with the computing device 105 using any of direct, indirect, and remote connections.

External devices 160 include one or more devices that are capable of receiving control signals 185 and outputting various sensory effects, but that generally might not be suitable or desirable for presenting the AV content items for a particular multimedia presentation. For example, stage lighting instruments can be used to illuminate desired areas within the presentation environment (e.g., operated as spotlights), but generally cannot output AV content items such as audio, video, imagery, etc. In another example, mobile or handheld computing devices belonging to persons of the audience can be capable of outputting some AV content items, but it may not be desirable to use the computing devices within the context of a multimedia presentation having a number of different viewers. Practically, the content that is output to particular computing devices might not be observed by the entire audience, or might not be suitably synchronized between different computing devices (e.g., distracting or unintelligible), etc. Generally, the capabilities of the external devices 160 can be used to augment, enhance, or otherwise improve the multimedia presentation according to the presentation script 190. Some examples of sensory effects include audio or visual effects, tactile effects, speech generation, device actuation, message receipt and display, and so forth.

In some embodiments, the computing device 105 can couple directly with the external devices 160 (i.e., sending control signals directly to the external devices). In other embodiments, a portable interface device 150 can be used to connect the computing device 105 with the external devices 160. The portable interface device 150 generally extends the communications capabilities of the computing device 105 by providing additional wireless communications modules.

Figure 2A:
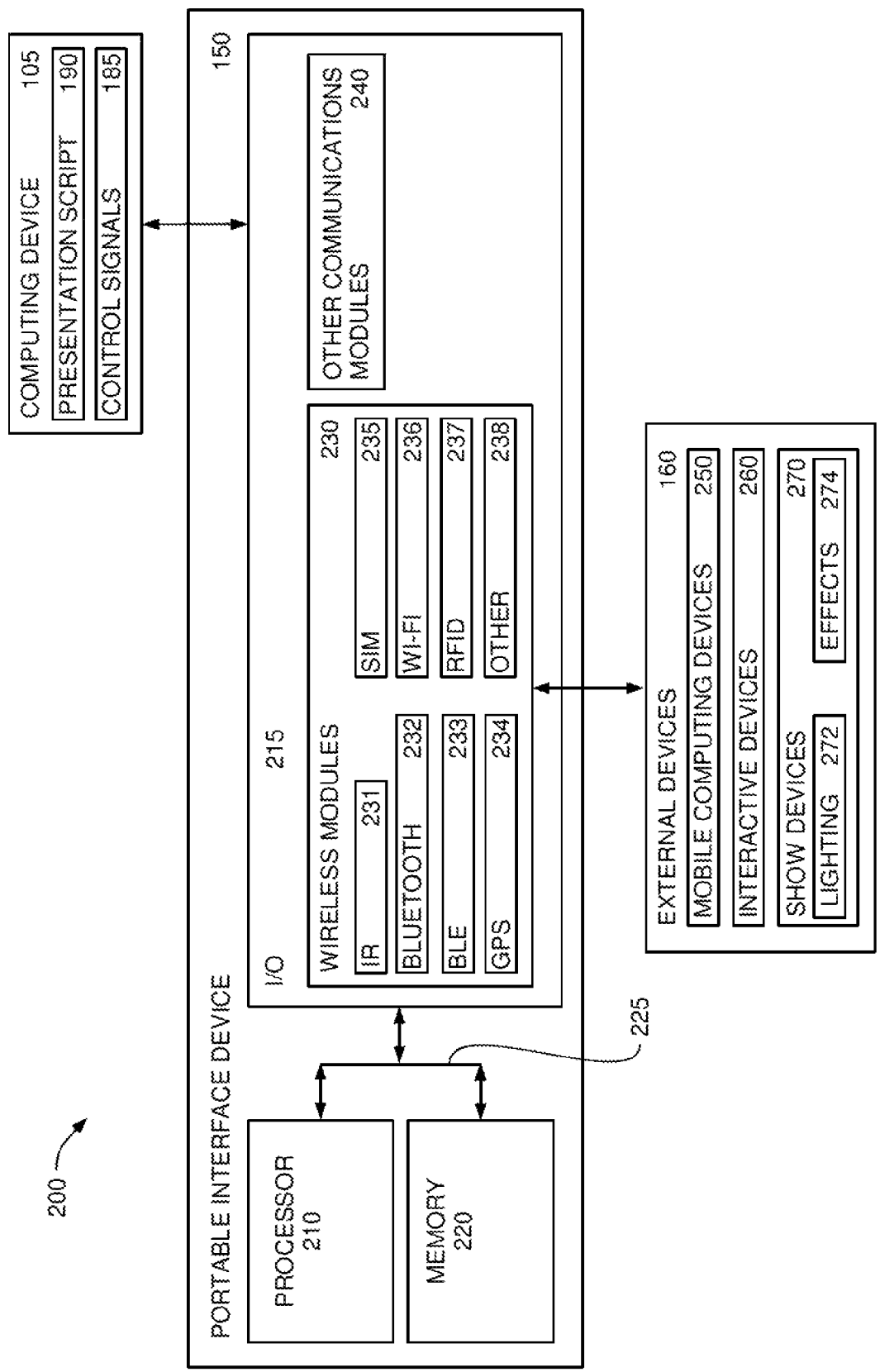
FIGS. 2A and 2B illustrate a portable interface device operable within a multimedia presentation control arrangement, according to one embodiment.

FIG. 2A illustrates a portable interface device 150 operable within a multimedia presentation control arrangement, according to one embodiment. The portable interface device 150 includes a processor 210, memory 220, and input/output 215, each of which is interconnected through a bus 225 or other interfaces.

Similar to processor 110, processor 210 can include any suitable processing element(s). In one embodiment, processor 210 functions to adapt received control signals 185 according to one or more communications protocols used by the corresponding external devices 160. In another embodiment, processor 210 might not directly adapt the received control signals, but can function as a coordinator to provide the received control signals to one or more hardware or firmware-based wireless modules 230 for subsequent transmission.

The wireless modules 230 can be used to adapt data included in input control signals 185 according to one or more communications protocols used by external devices 160. As shown, wireless modules 230 include infrared (IR) module 231, Bluetooth module 232, Bluetooth Low Energy (BLE) 233, Global Positioning System (GPS) module 234, Subscriber Identity Module (SIM) module 235, a Wi-Fi module 236, a radio-frequency identification (RFID) module 237, and other wireless modules 238. Some non-limiting examples of other wireless modules 238 include a Near Field Communication (NFC)-based device, an audio-based device, a video-based device, a laser-based device, and other radio frequency (RF)-based devices. This list provides but one example set of wireless protocols; other protocols can be included or different combinations selected. The wireless modules 230 can be embodied in any suitable format or combination of formats, such as hardware, firmware, and/or software. In one embodiment, wireless modules 230 include software that is executable by the processor 210. In another embodiment, wireless modules 230 include separate hardware or firmware circuitry, which might provide a reduced power consumption for the portable interface device 150.

The wireless modules 230 can be used to couple the computing device 105 with the external devices 160. In some cases, the computing device 105 does not natively include all of the communications functionality offered by the portable interface device 150. In one embodiment, at least one wireless module 230 provided by the portable interface device 150 is not natively supported by the computing device 105. Thus, the wireless modules 230 included in the portable interface device 150 can provide an extension of the capabilities natively included in the computing device 105.

The external devices 160 include one or more different types of devices that are suitable for enhancing or improving a multimedia presentation. External devices 160 can include mobile computing devices 250, such as cell phones, tablets, or laptop computers. External devices 160 can include interactive devices 260, such as interactive figures or wearable devices. External devices 160 can also include show devices 270 that are generally known within the entertainment, film, television, and theme park industries. Show devices 270 can include lighting devices 272, such as floodlights or spotlights or special categories of lighting (e.g., black lighting, strobes, lasers, etc.). Show devices 270 can include other effects devices 274 producing theatrical or special effects, such as smoke, fog, haze, mist, snow, wind, bubbles, confetti, stage pyrotechnics, etc. The show devices 270 have any suitable size and form for use within the multimedia presentation environment, ranging from small, portable devices to larger devices such as stage lighting instruments or stage machinery.

The external devices 160 are coupled with the computing device 105 through one or more wireless interfaces, such as via the wireless modules 230. Each of the external devices 160 can include appropriate circuitry to support communication through the wireless interface. During operation, computing device 105 uses a presentation script 190 to generate appropriate control signals 185. These control signals 185 are sent to the external devices 160 through the wireless interfaces to trigger behaviors (i.e., behaviors 194) for the external devices 160 at selected times during the multimedia presentation, and along with the AV content items 180 that are output using AV output devices 140. In some embodiments, the transmission of AV content items 180 to AV output devices 140 is concurrent with the transmission of control signals 185 through one or more wireless interfaces, allowing for a seamless appearance of the triggered content during the multimedia presentation. In some embodiments, the respective transmissions can be performed serially.

Additionally, I/O 215 can include one or more other communications modules 240 that include one or more physical ports supporting wired and/or optical connections with other devices, e.g., using RS-232, USB, I²C, etc. In one embodiment, the computing device 105 is configured to communicate with the portable interface device 150 using a wired connection through a communications module 240. In an alternative embodiment, however, the computing device 105 communicates with the portable interface device 150 using at least one of the wireless protocols available through wireless modules 230.

In one embodiment, the computing device 105 connects with AV output devices 140 without connecting through the portable interface device 150. For example, the computing device 105 can connect with AV output devices 140 using a wired connection, or a wireless connection that is separate from the connections provided through wireless modules 230. In another embodiment, the computing device 105 uses the portable interface device 150 to connect with the AV output devices 140 (e.g., using wireless modules 230).

Figure 2B:
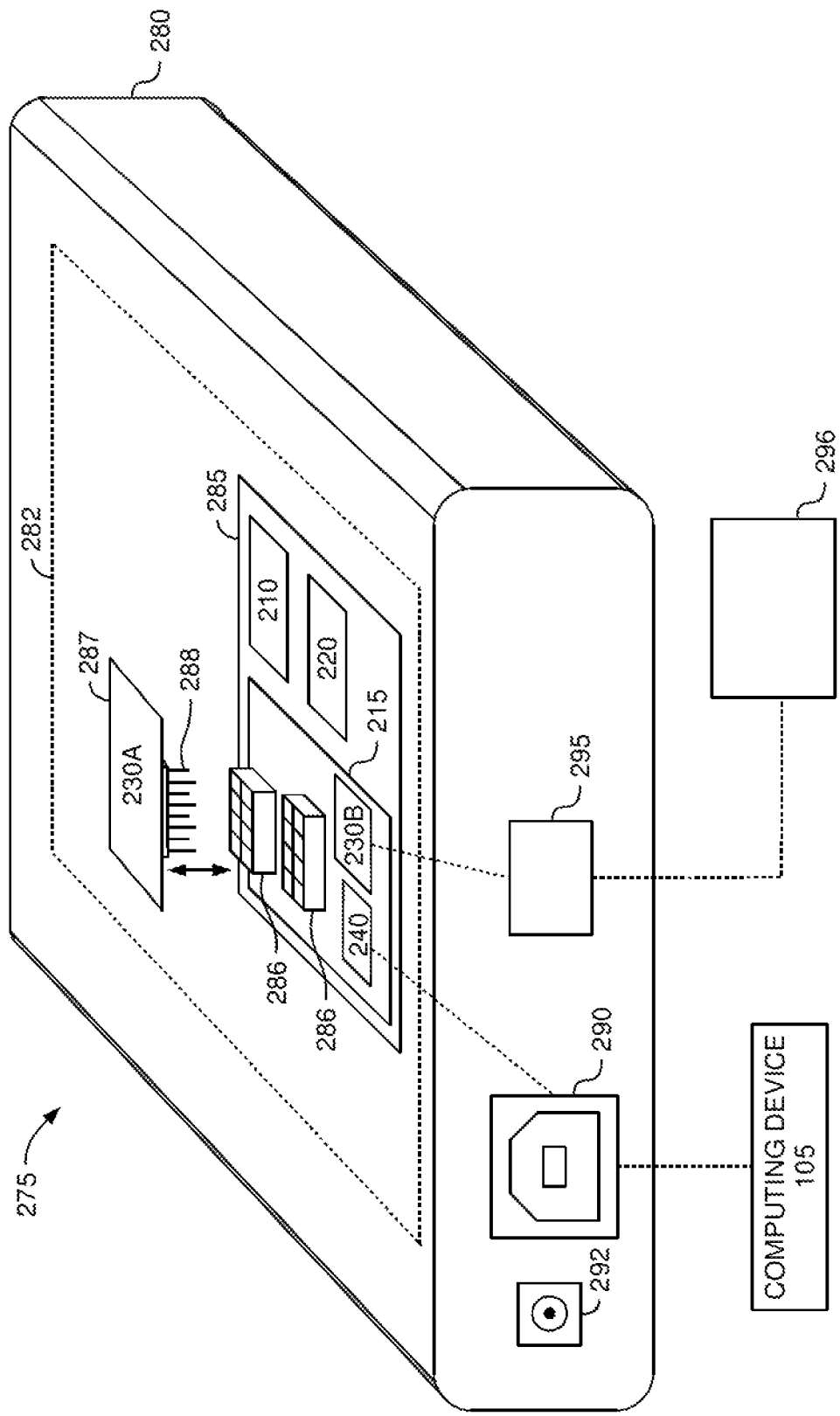

FIG. 2B illustrates a portable interface device 275 operable within a multimedia presentation control arrangement, according to one embodiment. Specifically, FIG. 2B illustrates a portable interface device 275 that includes a housing 280 with a cutaway portion 282 included to illustrate components included within housing 280. The portable interface device 275 represents one possible configuration of the portable interface device 150.

As shown, the wireless modules 230 can be provided as one or more separate circuit boards (e.g., daughterboards 287) that are removably coupled with a motherboard 285 including processor 210 and memory 220. The motherboard 285 can be fixedly attached to the housing 280 (e.g., fastened or adhered) or attached through one or more support members. Motherboard 285 is a circuit board that can include a number of connectors 286 of the same type or varying types.

The connectors 286 are configured to receive corresponding pins 288, or to otherwise couple with corresponding connection hardware included on the daughterboards 287. Motherboard 285 may alternately include pins that couple with connectors on the daughterboards 287, or may include alternate connections (such as a ribbon cable or other wiring). In another embodiment (not shown), the processor and/or memory are included on a common circuit board with hardware or firmware used to provide some or all of the wireless modules 230.

The portable interface device 275 can include one or more ports supporting wired connections with other devices. In one embodiment, the portable interface device 275 includes a power port 292 for receiving electrical energy to power the device's electronic components and/or to recharge an energy storage device (e.g., battery, uninterrupted power supply (UPS), capacitor) included in the housing 280. The portable interface device 275 can include a port 290 for communicating with the computing device 105, e.g., receiving control signals that are used to control the one or more external devices. While port 290 is depicted as having a Universal Serial Bus (USB) connector type, any suitable interface connector may be used. In one embodiment, the portable interface device 275 receives power and data through the port 290. In an alternate embodiment, the portable interface device 275 communicates wirelessly with the computing device 105, so that port 290 is optionally used.

Additionally, the portable interface device 275 can include one or more ports 295 providing external connectivity. In one embodiment the portable interface device 275 can be used to output the AV content items 180 of the multimedia presentation to the AV output devices 140 (not shown), e.g., using ports 295 or wireless modules 230, in addition to control of the external devices 160. In one embodiment, the portable interface device 275 connects using ports 295 with one or more supporting devices 296. In some embodiments, the wireless modules 230 can operate using communications protocols that depend on establishing a line-of-sight (LOS) between communicating devices (e.g., IR). However, the housing 280 of the portable interface device 275 in some cases might not be configured to accommodate LOS communications (e.g., constructed of an opaque material, no openings, etc.). Additionally, even if housing 280 can support LOS communications, it might still be impractical to manipulate or reorient the housing 280 (i.e., to "aim" the portable interface device 275) to establish the LOS. Therefore, supporting devices 296 can be coupled with the corresponding wireless module 230 to simplify establishing a LOS connection. For example, a supporting device 296 can be manually or mechanically actuable to direct an IR beam from the supporting device 296 towards the external device's IR receiver. In another embodiment, the supporting device 296 is configured to communicate with the corresponding wireless module 230 via wireless communication (e.g., a different, non-LOS-based protocol), such that a wired connection through port 295 would not be required.

To enhance multimedia presentations by incorporating content from external devices, an external show controller separate from the computing device controlling the presentation is typically required to operate the external devices. During operation, the external show controllers provide input signals (e.g., via MIDI, MDX, etc.) to the computing device, and the computing device uses these signals to control some timing aspects of the presentation (e.g., video or audio content). In other words, the programming of the external show controller is performed separate from the multimedia presentation. During operation, the external show controller is not controlled by the computing device that presents and controls the multimedia presentation, but instead the external show controller dictates the timing of certain elements within the presentation.

In many cases, external show controllers are also large and expensive computing devices, such as rack-mounted devices meant to have a more or less permanent installation. External show controllers also require a user to possess a significant knowledge of computer programming techniques, as the programming language may be particular to the controller. The user may also be required to perform the interfacing of the external devices with the show controller, which requires at least a basic knowledge of electrical engineering principles in addition to computer programming aspects.

In embodiments disclosed herein, content and control of the multimedia presentation and activation of external devices can be performed from a single computing device, such as a desktop or laptop computer or a mobile computing device. The computing device when executing the presentation script can trigger content from external devices seamlessly with the presentation of AV content items, instead of relying on signals from the show controller. Using the presentation script to coordinate the behaviors of various external devices with the presentation of AV content items, the combination of effects provides a more fully integrated multimedia presentation and more immersive environment.

Additionally, the activation of external devices can be enabled for an "ordinary" computing device (such as a personal computer operating Mac OS, Windows, Linux, or UNIX operating systems) by connecting the computing device with a portable interface device 275 and by executing the presentation software on the computing device. The portable interface device can overcome limitations of the computing device and extend the communications capabilities of the computing device. The presentation software enables end-users to script the multimedia presentation, including controlling external devices, without requiring computer programming on the part of the end user.

Figure 3:
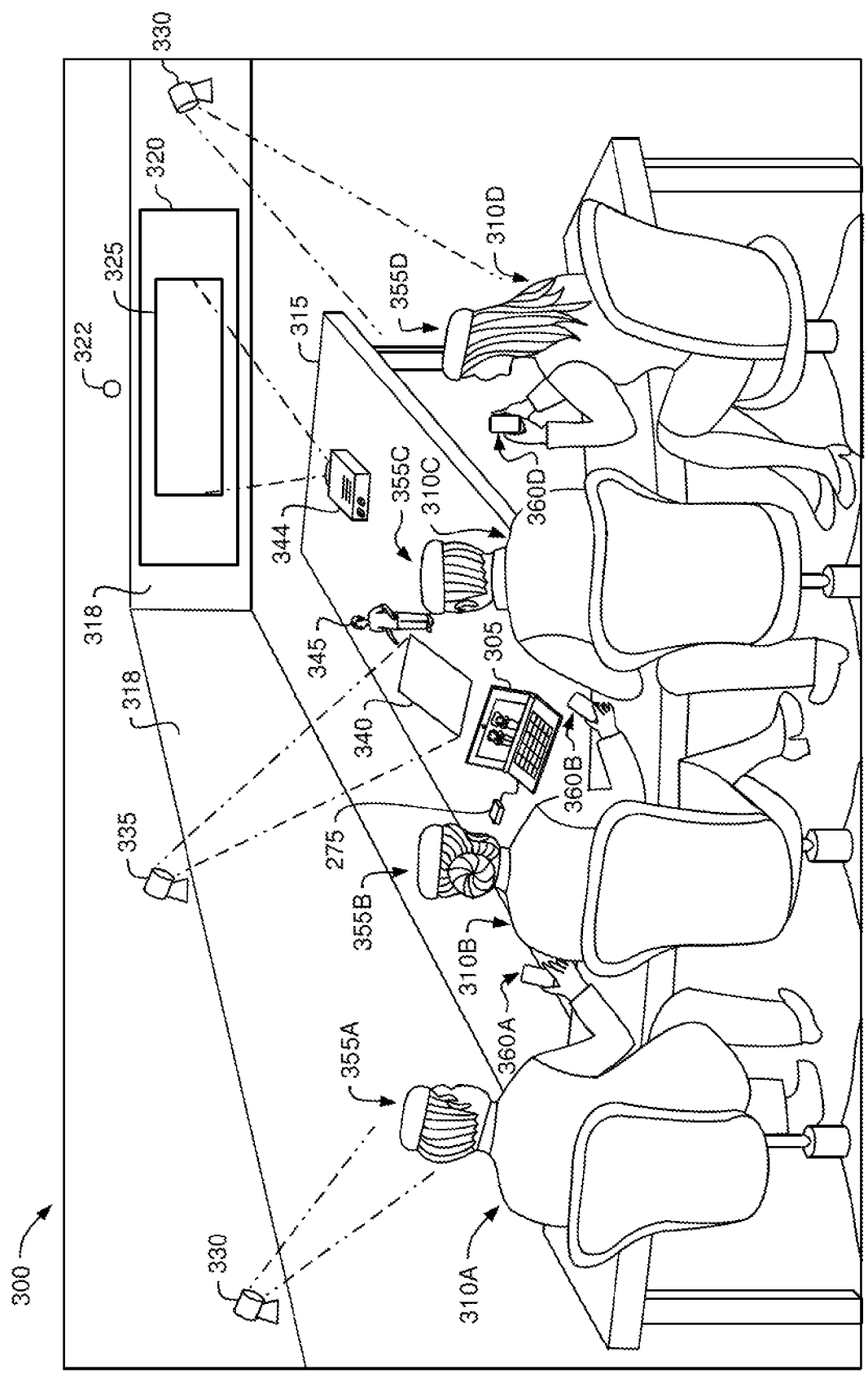
FIG. 3 illustrates exemplary operation of a multimedia presentation control arrangement, according to one embodiment.

FIG. 3 illustrates exemplary operation of a multimedia presentation control arrangement within an environment 300, according to one embodiment. The environment 300 includes a plurality of walls 318, a table 315 and a plurality of individuals 310 seated at the table 315, such as might be common for a business meeting or a presentation in a conference room. Other environments that include elements such as a computing device, audiovisual output devices, and external devices are also suitable. Some non-limiting examples of suitable environments include classrooms, home theaters, concert halls, churches, auditoriums, and so forth.

The computer 305 provides control of the multimedia presentation, outputting one or more AV content items using associated AV output devices. As shown, the AV content items can be visually displayed using a projector 344 that projects a projection area 325 onto a background or screen 320. Some alternative examples of AV output devices include a single electronic visual display (e.g., positioned at the location of screen 320) or a plurality of displays (e.g., smaller displays arranged for view by one or a few persons). Beyond visual content, the AV content items can include audio content that is output using one or more audio output devices, such as standalone speakers, headphones, mounted speakers, speakers integrated with other components (e.g., the computer 305, the table 315), and so forth.

The computer 305 can connect directly with AV output devices, or may connect using portable interface device 275. For example, the computer 305 may include a separate wired or wireless connection supporting communications directly from computer 305 to projector 344. For cases using the portable interface device 275, the computer 305 may have a wired or wireless connection with the portable interface device 275, which in turn is connected either directly with the projector 344 or through an intermediate device 322 (e.g., a repeater) that is disposed in a selected location (whether fixed or movable) within the environment 300. In one embodiment, the intermediate device 322 may be a supporting device 296.

Based on the presentation script, the computer 305 also provides control of one or more external devices in coordination with output of the AV content items of the multimedia presentation. In environment 300, the external devices include a plurality of spotlights 330, a secondary display device 335, interactive figures (e.g., an interactive plush doll 345), and interactive wearable items (e.g., illuminating caps 355). The external devices may also include handheld or mobile computing devices 360, such as cell phones or tablets. Each of the external devices may be coupled with the computer 305 through a wireless interface. Appropriate control signals may then be sent to the external devices using the wireless interfaces to trigger external device behaviors (i.e., behaviors 194) in real-time during the multimedia presentation.

The behaviors may vary according to the functionality of the particular external device. For example, the spotlights 330 are controlled to provide light of desired colors, patterns (temporally and/or spatially), intensities, and so forth. Additionally, the spotlights 330 or particular elements thereof can be actuated to provide light to different desired locations within the environment 300. Generally, behaviors included in the presentation script may specify one or more of the controllable aspects of the external device. For example, to simulate a police car during a multimedia presentation, one behavior could specify alternating blue and red lights (whether produced from a single spotlight 330 or using different spotlights) every 0.5 seconds that are moved in a horizontal sweeping pattern around the environment for a total of 10 seconds. In some embodiments, timing aspects specified in the behavior are referenced to the corresponding AV content item. Using the previous police car example, a behavior might specify continuing the light pattern as long as a current slide is displayed, or with reference to particular time markers of a video file, etc.

A secondary display device 335 can be included in the environment 300 and used to provide a visual display that complements the AV content items presented during the multimedia presentation. The secondary display device 335 can include one or more projectors (as shown) or and/or electronic visual displays. The secondary display device 335 may display any suitable visual content, such as video or image files, text documents, secondary slideshows, and so forth. In one embodiment, the secondary display device 335 is configured to display at a display location 340 that is different than the display location(s) of the AV content items (i.e., at least partly outside of projection area 325 and/or any visual displays included in AV output devices). In one embodiment, the display location 340 corresponds to a work surface for the individuals 310, such as on the table 315. In one embodiment, the secondary display device 340 can display a form or other secondary content that corresponds to the AV content items that are displayed in projection area 325. In one embodiment, the secondary display device 340 can display open captioning or real-time stenography (also called Communication Access Real-Time Translation, or CART) corresponding to speech, dialogue, or other audio activity occurring within the presented AV content items. Such an embodiment could extend the accessibility of a multimedia presentation that includes significant audio-based content to the hearing-impaired.

An interactive figure such as doll 345 can also be included in environment 300. Behaviors can specify movement(s) of the interactive figure, such as displacing the entire figure using walking or rolling movements, actuating portions of the figure such as rotating its head, moving its limbs, opening and closing its mouth, blinking its eyes, and so forth. The behaviors can also specify various sensory outputs from the interactive figure, such as generating speech from text, or other audio, visual, or tactile outputs. The behaviors can combine one or more aspects in synchrony. For example, a behavior for the doll 345 could include a speech output and the doll's mouth is actuated based on the speech to appear as though the doll is talking.

Interactive wearable items such as illuminating caps 355 may also be included in environment 300. Example visual behaviors for the interactive wearable items may specify desired colors, patterns (temporally and/or spatially), and intensities of light, and so forth. Other interactive wearable items may include other audio, visual, and/or tactile outputs.

Example behaviors for mobile computing devices 360 may include any suitable audio, visual, and/or tactile outputs that are capable of being generated by the mobile computing device, for example, causing the mobile computing device to output audio or video files, output a sound or vibration, etc. In one embodiment, the control signals sent by the computer 305 to trigger the behaviors may include generating and transmitting messages or by transmitting other data. In one embodiment, CART captioning data may be transmitted to the mobile computing devices 360.

Figure 4:
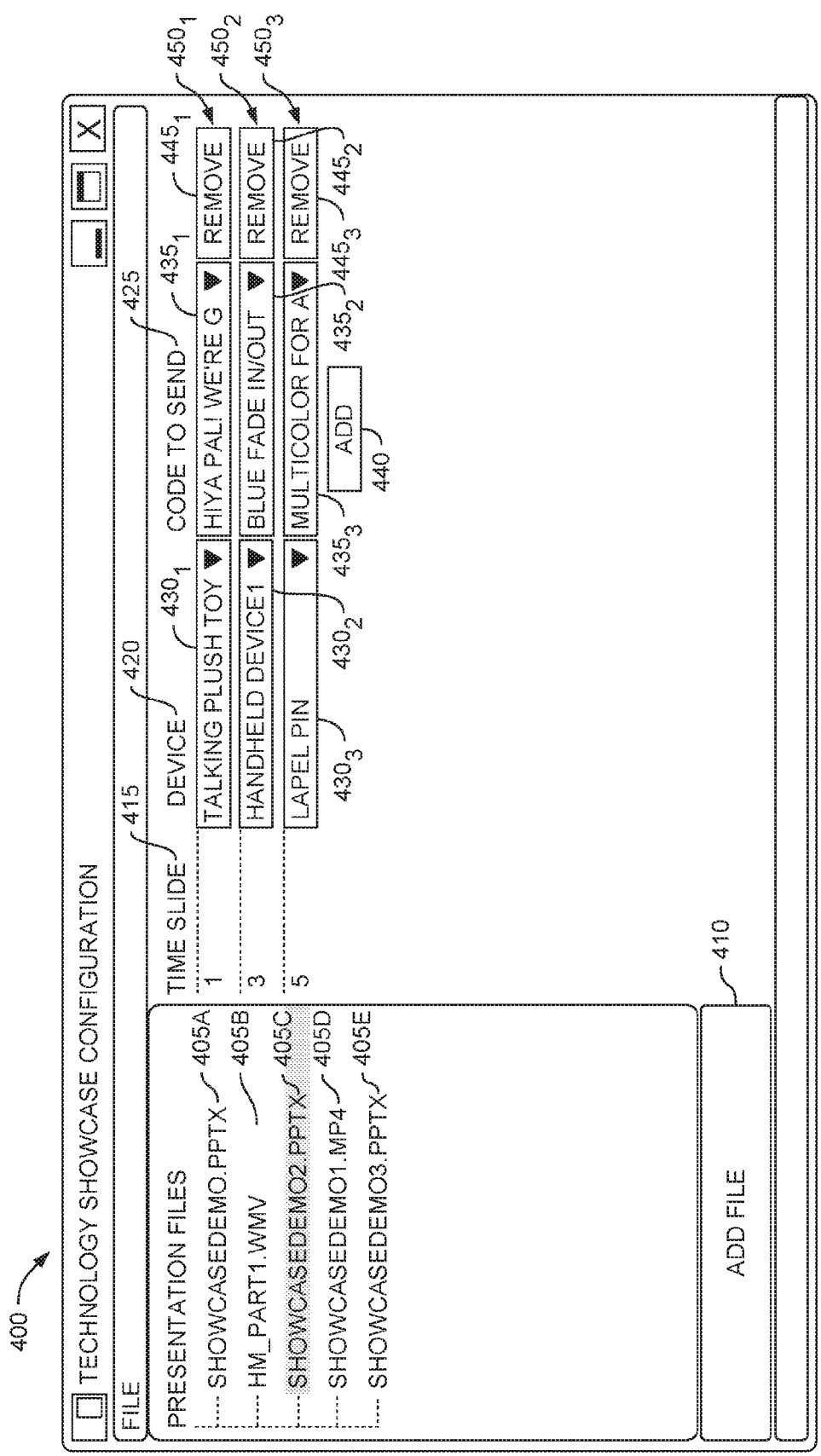
FIG. 4 illustrates a graphical user interface (GUI) used to create a presentation script, according to one embodiment.

FIG. 4 illustrates a graphical user interface (GUI) used to create a presentation script, according to one embodiment. The GUI may be included as part of the presentation program, which executes on the computing device and also controls the multimedia presentation. An end-user may therefore use the GUI to create a presentation script to control a multimedia presentation and/or external devices without requiring any knowledge of lower-level computer programming.

As shown, GUI window 400 includes a panel on the left side that allows AV content items to be selected, and a sequence of the AV content items to be specified. For example, the AV content items may be presented sequentially from content item 405A to content item 405E during the multimedia presentation. An end-user may selectively manipulate the order of AV content items, e.g., dragging items into a different sequence, deleting items, or adding items (e.g., using the "Add File" button 410).

Each of the AV content items 405 may be selectable to coordinate actions (such as actions $450_1$, $450_2$, $450_3$) of one or more external devices with the output of the selected content item. For each content item 405, a separate listing of selectable or customizable actions may be included. Each action may generally accept user input to indicate a timing for performing the desired action, to select which external device(s) will perform the desired action, and which behavior the selected external device(s) will perform. The user input may be provided in any suitable format, such as text or numerical input, drop-down menus, radio buttons, sliders, etc. Actions may be added to the actions $450_1$, $450_2$, $450_3$, e.g., using an "Add" button 440. Actions $450_1$, $450_2$, $450_3$ may be removed, e.g., using "Remove" buttons $445_1$, $445_2$, $445_3$.

As shown, content item 405C is a slideshow presentation file ("ShowcaseDemo2.pptx") that has been selected and is highlighted. The presentation script includes three actions $450_1$, $450_2$, $450_3$ associated with the content item 405C that will occur during the presentation of the content item 405C during the multimedia presentation.

As shown, timing information 415 may be entered by a user. The appearance or format of the timing information 415 may differ depending on the properties of the associated content item. For example, the slideshow presentation file may have timing information with reference to the slide number, the time on a particular slide, the total elapsed time within the slideshow, and so forth. For a different type of content item such as a video or audio file, however, a reference to a particular slide number may not be meaningful. In one embodiment, a single input field may be provided per action in the GUI to receive timing information from an end-user, and the input received in the action's field is then processed based on the properties of the content item. For example, a number "1" entered in the case of a slideshow presentation file may be determined to reference slide 1, while the "1" could be determined to reference a 1-minute mark for an audio file, a first page for a text document, and so on. Although in this embodiment separate numerical input fields are included for receiving timing information input, the GUI window 400 may be arranged to provide alternative ways to receive timing information input and display the timing information for an end-user. For example, the timing of the content items may be displayed as separate or collective linear timelines, and external device actions may be displayed as markers on the respective timeline(s).

The device information 420 allows the selection of particular external device(s) from a list of external devices 430 coupled with the computing device. Some examples of the external devices include interactive figures (e.g., talking plush toy $430_1$) and wearable devices (e.g., wearable device $430_2$, lapel pin $430_3$), as well as mobile computing devices. In some embodiments, more than one external device may be selected for a particular action.

The behavior information 425 specifies which behavior 435 the corresponding external device 430 will take at the appropriate time specified by timing information 415. Behaviors 435 may differ depending on the particular external device or type of device, and may correspond to different types of sensory outputs, such as text-to-speech, audio output, illumination, message generation and transmission, and so forth. Behaviors may 435 be predefined, and/or aspects of the behaviors 435 may be customizable by an end-user. As shown, the interactive talking plush toy $430_1$ will output speech during slide 1 in behavior $435_1$ (i.e., "Hiya pal! We're gonna have a swell time together . . . "), the wearable device $430_2$ will illuminate blue in a defined fade pattern during slide 3 in behavior $435_2$, and lapel pin $430_3$ will illuminate in a defined color pattern during slide 5 in behavior $435_3$ (i.e., "Multicolor for awhile"). Any number of different behaviors may be specified for the external devices. In one embodiment, a portion of the GUI (e.g., a separate GUI screen) is used to customize behaviors, which may include a listing of selectable options that are supported by the particular external device as well as fields accepting textual input (e.g., providing the text to be spoken by an interactive figure).

Importantly, the GUI allows an end-user to select the desired behaviors and timing for the multimedia presentation without requiring the end-user to have any knowledge of computer coding to program the external devices. This offers a marked improvement over external show controllers, which require more in-depth programming skill to produce a coordinated presentation.

Figure 5A:
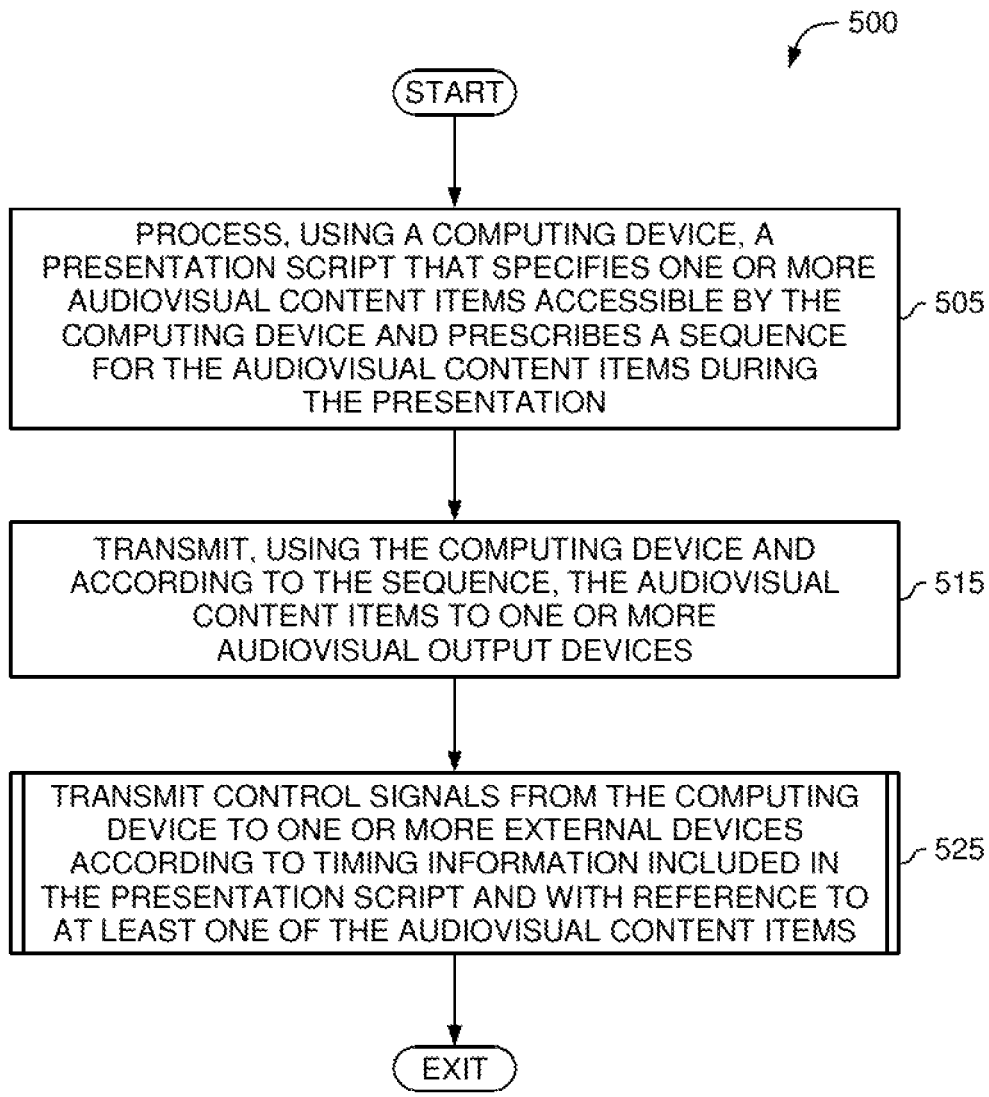
FIG. 5A illustrates a method to integrate a multimedia presentation with triggered content provided by one or more external devices, according to one embodiment.

FIG. 5A illustrates a method to integrate a multimedia presentation with triggered content provided by one or more external devices, according to one embodiment. Generally, method 500 may be used with multimedia presentation control arrangements 100 and 200 and within environment 300.

At block 505, a computing device processes a presentation script that specifies one or more audiovisual content items that are accessible by the computing device, and that prescribes a sequence for the audiovisual content items during the presentation.

At block 515 the computing device transmits the audiovisual content items to one or more audiovisual output devices according to the prescribed sequence.

At block 525 the computing device transmits control signals to one or more external devices according to timing information that is included in the presentation script. The timing information is provided with reference to at least one of the audiovisual content items.

Figure 5B:
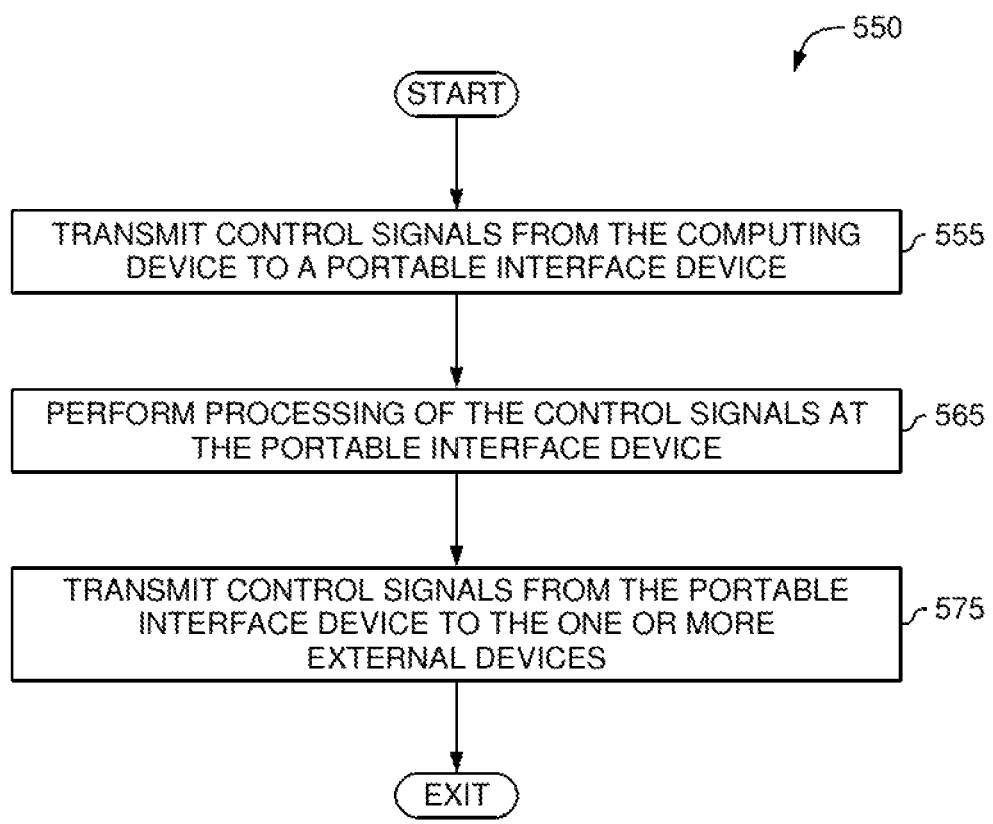
FIG. 5B illustrates a method to transmit control signals to external wireless device via a portable interface device, according to one embodiment.

FIG. 5B illustrates a method to transmit control signals to external wireless devices via a portable interface device, according to one embodiment. Method 550 may be a subroutine executed as part of block 525. Method 550 may generally be used where the computing device does not communicate directly with the external devices, but communicates through an intermediate portable interface device. Method 550 begins at block 555, where control signals are transmitted from the computing device to the portable interface device. The control signals may be stored in a memory of the portable interface device.

Optionally, at block 565 the portable interface device performs processing on the control signals. In one embodiment, the portable interface device processes the received control signals to convert them into a format that may be received and read by the particular external device. The portable interface device can receive the instructions in a different form, such as in a higher-level language or formatted using a different communications protocol, such that the instructions require reformatting before transmission to the particular external device. The processing can be performed using a processor included with the portable interface device.

At block 575 the portable interface device transmits the control signals to the one or more external devices. This can include the unmodified control signals that were received from the computing device, or modified control signals based on the processing of block 565.

The disclosure is not limited to specific described embodiments. Instead, any combination of the features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the aspects, features, embodiments and advantages described herein are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized, including but not limited to an electronic, magnetic, optical, electromagnetic, infrared, or semiconductor system, apparatus, or device, or any suitable combination of the foregoing. More specific examples (a non-exhaustive list) of the computer readable storage medium include: an electrical connection having one or more wires, a hard disk, a random access memory (RAM), a read-only memory (ROM), an erasable programmable read-only memory (EPROM or Flash memory), an optical fiber, a compact disc or digital versatile disc (CD, DVD), an optical storage device, a magnetic storage device, or any suitable combination of the foregoing (including chemical or organic storage methods). In the context of this document, a computer readable medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. The program code for carrying out operations for aspects of the present disclosure may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. The computer program instructions may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to integrate a multimedia presentation with triggered, external content that is provided using one or more external devices, the method comprising:
    processing, using a computing device, a presentation script that specifies (i) one or more audiovisual content items that are accessible by the computing device, (ii) a sequence of the one or more audiovisual content items for presentation during the multimedia presentation, and (iii) timing information describing a timing of one or more actions to be performed using the one or more external devices, wherein the one or more actions are distinct from the one or more audiovisual content items, and wherein the timing of individual actions of the one or more actions is referenced to a presentation timing for an individual audiovisual content item of the one or more audiovisual content items;
    transmitting, using the computing device and according to the sequence, the one or more audiovisual content items to one or more audiovisual output devices that are coupled with the computing device; and
    transmitting control signals from the computing device to the one or more external devices, wherein the control signals configure the one or more external devices to perform the one or more actions according to the timing information specified by the presentation script.

2. The method of claim 1, wherein transmitting control signals from the computing device to the one or more external devices includes transmitting the control signals from the computing device to a portable interface device operatively connected with the computing device, and wherein the control signals are subsequently transmitted from the portable interface device to the one or more external devices.

3. The method of claim 2, wherein the portable interface device includes one or more hardware-based wireless modules, each wireless module supporting a different wireless communications protocol, and wherein at least one wireless communication protocol is not supported natively by the computing device.

4. The method of claim 2, wherein the one or more audiovisual content items are transmitted from the computing device to the one or more audiovisual output devices and not via the portable interface device.

5. The method of claim 1, wherein the presentation script is generated by an end-user via a graphical user interface (GUI) and without requiring any programming on the part of the end-user.

6. The method of claim 5, wherein the GUI includes a plurality of selectable behaviors for the one or more external devices, each selectable behavior corresponding to program code to be included in the control signals and used to operate the external devices.

7. The method of claim 5, wherein the presentation script is processed by a software application executing on an operating system, and wherein the operating system is selected from Windows, Mac OS, Linux, and UNIX.

8. A computer program product to integrate a multimedia presentation with triggered, external content that is provided using one or more external devices, the computer program product comprising:
    a computer-readable storage medium having computer-readable program code embodied therewith, the computer-readable program code executable by one or more computer processors to:
        process a presentation script that specifies (i) one or more audiovisual content items accessible by the one or more computer processors, (ii) a sequence of the one or more audiovisual content items for presentation during the multimedia presentation, and (iii) timing information describing a timing of one or more actions to be performed using the one or more external devices, wherein the one or more actions are distinct from the one or more audiovisual content items, and wherein the timing of individual actions of the one or more actions is referenced to a presentation timing for an individual audiovisual content item of the one or more audiovisual content items;
        transmit, according to the sequence, the one or more audiovisual content items to one or more audiovisual output devices that are communicatively coupled with the one or more computer processors; and
        transmit control signals to the one or more external devices, wherein the control signals configure the one or more external devices to perform the one or more actions according to the timing information specified by the presentation script.

9. The computer program product of claim 8, wherein transmitting control signals to the one or more external devices includes transmitting the control signals to a portable interface device coupled with the external devices, and wherein the control signals are subsequently transmitted from the portable interface device to the one or more external devices.

10. The computer program product of claim 9, wherein the portable interface device includes one or more hardware-based wireless modules, each wireless module supporting a different wireless communications protocol.

11. The computer program product of claim 9, wherein the one or more audiovisual content items are transmitted to the one or more audiovisual output devices without being transmitted via the portable interface device.

12. The computer program product of claim 8, wherein the presentation script is generated by an end-user via a graphical user interface (GUI) and without requiring any programming on the part of the end-user.

13. The computer program product of claim 12, wherein the GUI includes a plurality of selectable behaviors for the one or more external devices, each selectable behavior corresponding to program code to be included in the control signals and used to operate the external devices.

14. The computer program product of claim 12, wherein the presentation script is processed by a software application executing on an operating system, and wherein the operating system is selected from Windows, Mac OS, Linux, and UNIX.

15. A system to integrate a multimedia presentation with triggered, external content provided using one or more external devices, the system comprising:

a computing device configured to process a presentation script that specifies (i) one or more audiovisual content items that are accessible by the computing device, (ii) a sequence of the one or more audiovisual content items for presentation during the multimedia presentation, and (iii) timing information describing a timing of one or more actions to be performed using the one or more external devices, wherein the one or more actions are distinct from the one or more audiovisual content items, and wherein timing information of individual actions of the one or more actions is referenced to a presentation timing for an individual audiovisual content item of the one or more audiovisual content items;

one or more audiovisual output devices coupled with the computing device and configured to present the one or more audiovisual content items; and the one or more external devices coupled with the computing device, wherein the computing device is further configured to transmit control signals to the one or more external devices, wherein the control signals configure the one or more external devices to perform the one or more actions according to the timing information specified by the presentation script.

16. The system of claim 15, further comprising a portable interface device operatively connected with the computing device, wherein transmitting control signals from the computing device to the one or more external devices includes transmitting the control signals from the computing device to the portable interface device, and subsequently transmitting the control signals from the portable interface device to the one or more external devices.

17. The system of claim 16, wherein the portable interface device includes one or more hardware-based wireless modules, each wireless module supporting a different wireless communications protocol, and wherein at least one wireless communication protocol is not supported natively by the computing device.

18. The system of claim 17, wherein the one or more external devices are selected from an infrared (IR) device, a Bluetooth device, a Bluetooth Low Energy (BLE) device, a Global Positioning System (GPS) device, a subscriber identity module (SIM) device, a Wi-Fi device, a radio-frequency identification (RFID) device, a Near Field Communication (NFC) device, an audio-based device, a video-based device, a laser-based device, and a radio-frequency (RF) device.

19. The system of claim 16, wherein the one or more audiovisual content items are transmitted from the computing device to the one or more audiovisual output devices and not via the portable interface device.

20. The system of claim 15, wherein the presentation script is generated by an end-user via a graphical user interface (GUI) and without requiring any programming on the part of the end-user.

* * * * *